United States Patent [19]
Sherwood

[11] Patent Number: 5,589,115
[45] Date of Patent: Dec. 31, 1996

[54] METHOD FOR MAKING FIBER-REINFORCED CERAMIC MATRIX COMPOSITE

[75] Inventor: Diana L. Sherwood, Wellsville, N.Y.

[73] Assignee: Corning Incorporated, Corning, N.Y.

[21] Appl. No.: 468,687

[22] Filed: Jan. 23, 1990

Related U.S. Application Data

[63] Continuation of Ser. No. 121,413, Nov. 16, 1987, abandoned.

[51] Int. Cl.$^6$ ............................ C04B 33/36; B05D 3/06
[52] U.S. Cl. ................................................. 264/60
[58] Field of Search .................................. 264/60

[56] References Cited

U.S. PATENT DOCUMENTS

| | | | |
|---|---|---|---|
| 1,931,494 | 10/1933 | Hurden | 154/45.9 |
| 3,157,722 | 11/1964 | Moore | 264/266 |
| 3,575,789 | 4/1971 | Siefert et al. | 501/95 |
| 3,953,704 | 4/1976 | Hurwitt | 219/10.55 |
| 4,528,238 | 7/1985 | Alford | 428/246 |
| 4,613,473 | 9/1986 | Layden et al. | 264/103 |
| 4,623,228 | 11/1986 | Galasso et al. | 350/609 |
| 4,666,645 | 5/1987 | Prewo et al. | 264/87 |
| 4,689,188 | 8/1987 | Bhatt | 264/60 |
| 4,886,682 | 12/1989 | Singh et al. | 427/56.1 |

FOREIGN PATENT DOCUMENTS 2143812  2/1985  United Kingdom.

*Primary Examiner*—Peter A. Nelson
*Attorney, Agent, or Firm*—Kees van der Sterre

[57] ABSTRACT

Fiber-reinforced ceramic matrix composites are fabricated by a process wherein a fiber reinforcement material, preferably in the form of a fiber array or ribbon of parallel-aligned monofilament fibers, is combined with multiple sheets of ceramic matrix material, preferably in the form of thin flexible ceramic tape. A preform consisting of a layered assembly of the fibers and ceramic matrix sheet is consolidated with heat and pressure into an integral, substantially void-free ceramic matrix composite wherein the matrix has fully penetrated and infiltrated the fiber array and wherein the fibers are disposed in precise alignment and position, following the fiber alignment in the preform.

19 Claims, 1 Drawing Sheet

U.S. Patent  Dec. 31, 1996  5,589,115
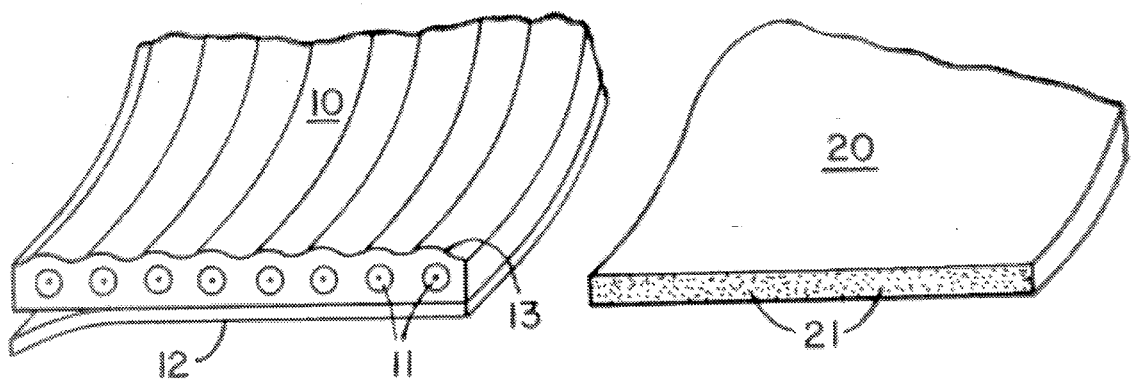
Fig. 1
Fig. 2
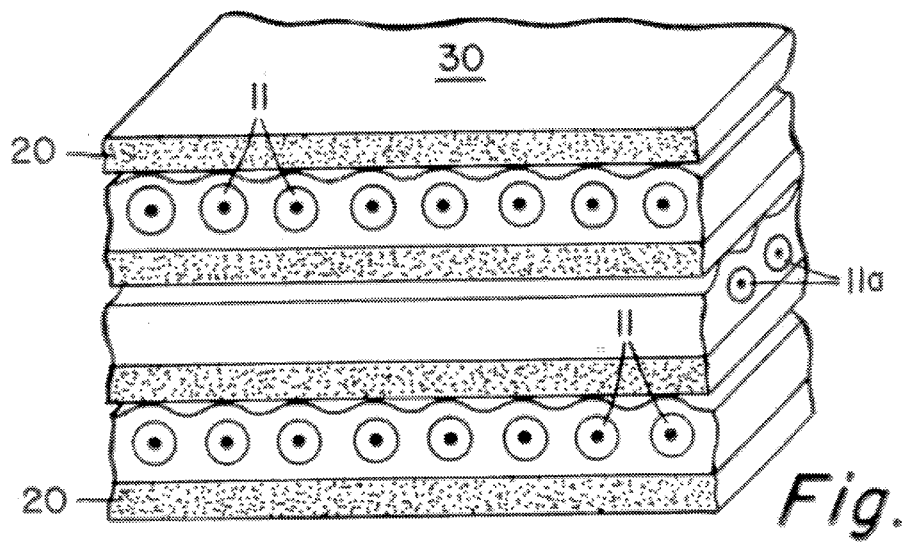
Fig. 3
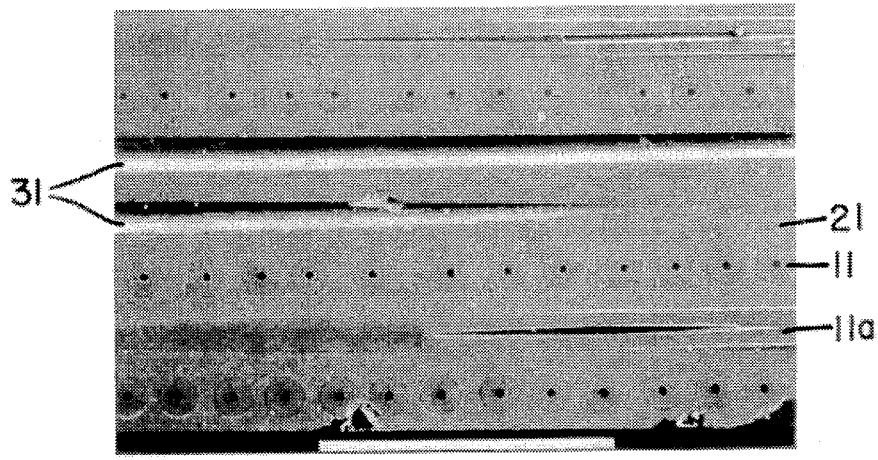
Fig. 4

METHOD FOR MAKING FIBER-REINFORCED CERAMIC MATRIX COMPOSITE

This application is a continuation of Ser. No. 121,413, filed on Nov. 16, 1987, and now abandoned.

BACKGROUND OF THE INVENTION

The present invention relates to a method for the manufacture of fiber-reinforced composite products comprising a matrix composed of a ceramic material, and more particularly to an improved method for making a fiber-reinforced ceramic matrix composite which provides a product of high strength and high density at low cost.

The concept of incorporating fibers or other continuous reinforcing materials or phases in materials subject to tensile stress fracture is quite old, one of the earliest applications being the use of such reinforcement to provide toughened concrete or cement products. For example, U.S. Pat. No. 1,931,494 discloses the use of reinforcing tapes of textile materials to strengthen asbestos cement products. More recently, reinforced cement products have been described in U.S. Pat. No. 4,528,238 which are made by pressing woven or unwoven fiber mats into soft, moldable cement sheet formed by rolling or extrusion, thus to provide fiber-reinforced cement sheet products.

It is also well known to employ fiber or whisker reinforcement to provide toughened refractory ceramic products comprising ceramic matrix materials such as alumina. Thus, for example, U.S. Pat. No. 3,157,222 describes a process for making an alumina ceramic reinforced with fiber wherein a metal fiber or wire is continuously wound onto a substrate while aluminum oxide is applied to the wire and substrate by flame spraying. More recent practice is to apply the ceramic matrix material as a powder to a fibrous reinforcement material, and then to consolidate the coated fibers. Hence U.S. Pat. No. 4,623,228 describes the fabrication of a fiber-reinforced glass composite wherein fibers coated with glass powders are laid up into sheet and consolidated with heat and pressure into a strong, unitary composite.

There also exist applications wherein thin ceramic sheets are employed without fiber reinforcement to provide thin ceramic substrates or barrier layers. U.S. Pat. No. 3,953,703, for example, discloses the manufacture of thin ceramic tape by a process known as tape-casting, wherein a slurry comprising a ceramic powder and a binder is cast or extruded as thin sheet and thereafter dried to provide a thin, relatively tough and flexible ceramic tape. Such tapes have been employed, for example, to provide dielectric layers for capacitors and as thin ceramic substrates for microelectronic devices.

In the field of fiber-reinforced ceramics it is customary to employ flowable ceramic slurries, and to fabricate composite products by coating reinforcing fibers with the slurry and then arranging the coated fibers into the shape of the desired composite. Among the disadvantages of this procedure are the difficulties attendant upon the preparation of slurries having appropriate viscosity and coating characteristics, and the problem of attaining a uniform coating of the ceramic material on the fiber so that a homogeneous composite material may be attained as the coated fibers are formed into the desired product or preform. Therefore, techniques for providing ceramic matrix composites which do not require the slurry-coating of fibers or whiskers, or of felts or woven fabrics made of such fibers, have been sought.

In an alternative approach to the manufacture of such composites, U.S. Pat. No. 4,613,433 teaches a method wherein cloths of fibrous reinforcement material are combined with similarly woven cloths formed of threads or yarns made from the matrix material itself, and the combined cloths consolidated to provide a layered composite structure. Alternatively, threads or yarn of the reinforcing fiber and the matrix material can be woven together into a composite cloth which can be consolidated with heat and pressure to produce a dense fiber-reinforced material.

This method is unfortunately limited in its application to those ceramic matrix materials which can economically and conveniently be formed into thread or yarn. In addition, such procedures risk damage and/or unwanted shifting or the fibers during the consolidation stage of the process, due to the spatial readjustments of matrix and reinforcing fiber phases which necessarily occur during the consolidation of the woven material into a non-porous product.

An alternative method for making a composite material which avoids the use of ceramic slurries is that disclosed in U.S. Pat. No. 4,666,645. In the process disclosed in that patent, chopped fibers of the reinforcing material and fibers of the matrix material are mixed and combined into a non-woven felt material which may then be consolidated into a dense composite. Alternatively, the method employs felts made of the reinforcing fibers alternating with felts formed of fibers of the matrix material, with the superimposed felts thereafter being compressed and heat-consolidated into a dense material. Again, however, the application of this method is limited to matrix materials which can be fiberized, and substantial fiber movement and matrix flow are required for dense consolidation which can damage the reinforcing fibers.

A particularly desirable design for a fiber-reinforced ceramic matrix composite for applications requiring strong, thin ceramic materials is a design wherein uniform layers of parallel-aligned monofilament fibers are disposed within the ceramic matrix material. This design imparts very high strength and stiffness to the composite in directions transverse to the reinforcing fiber layers, and could in theory provide the advantage of a high degree of homogeneity with respect to both fiber distribution and physical properties in the laminates.

Unfortunately, no method yet devised for manufacturing ceramic matrix composites, including the slurry dip and fiber winding process earlier described, is presently capable of permitting the manufacture of composites of this design with the requisite homogeneous structure and high density.

It is therefore an object of the present invention to provide a method for manufacturing ceramic matrix composites, and particularly ceramic matrix composites employing uniform layers of parallel-aligned fiber reinforcement, which avoids the need to utilize a fiber coating process yet provides a composite of high density and extremely uniform microstructure.

It is a further object of the invention to provide a method for making a fiber-reinforced ceramic matrix composite, and particularly a composite comprising discrete layers or plies of uniaxially oriented fibers, which is both convenient and more economical than prior art methods for making such composites.

Other objects and advantages of the invention will become apparent from the following description thereof.

SUMMARY OF THE INVENTION

The present invention avoids the requirement to combine the matrix material with a fiber reinforcing material by slurry dipping, and provides excellent control over the disposition of the fiber reinforcement in the ceramic matrix. This is achieved in accordance with the invention by providing the matrix material as thin flexible ceramic sheet. This sheet, consisting principally of a powdered ceramic matrix material and a binder material for the powder, is most conveniently provided in the form of a dry, flexible ceramic tape. In a preferred embodiment this tape is formed by conventional tape casting from a slurry of the powdered ceramic material, for example, by casting or extruding a plastic batch of the ceramic powder, the tape being thereafter dried to provide the ceramic material in relatively tough, flexible sheet form.

The fiber reinforcement material to be incorporated in a composite article in accordance with the invention is also provided in sheet configuration, in this case in the form of a sheet of refractory inorganic fibers. To facilitate dense consolidation of the fiber sheet with the ceramic sheet, the fiber sheet is relatively thin, and is preferably formed of one or only a few fiber layers in an open fiber array. By an open array is meant a woven or non-woven array of fibers comprising gaps or interstices permitting through penetration by the powdered ceramic matrix materials used to form the aforementioned ceramic sheets.

The fiber sheet is most preferably provided as a fiber tape comprising a parallel single-layer array of reinforcing fibers, the tape having a thickness when free of non-fiber constituents not substantially exceeding the thickness of the fibers themselves. Commercially available sheets or tapes, typically consisting of a single fiber layer bound into a parallel array on a supporting backing with an organic resin or adhesive, are generally suitable for this purpose.

To provide a composite ceramic product from these components, elements of a preform for the product are provided from the sheets of matrix material and fiber reinforcement, and these elements are stacked or otherwise layered to form a multilayer preform comprising fiber reinforcement layers interspersed among layers of the flexible matrix sheets. The layered preform is then subjected to heat and pressure sufficient to consolidate it into a dense, void-free fiber-reinforced ceramic matrix composite product.

Advantageously, because the thickness of the ceramic tape may be controlled in manufacture, the quantity and distribution of matrix material within the fiber composite can be easily controlled. Further, because the size and array density of monofilament fibers in flexible fiber sheets or tapes may be varied within wide ranges, excellent control over the number of fibers and the uniformity of fiber distribution within the composite material may be provided.

Microscopic examination of fiber-reinforced ceramic matrix composites provided employing the method of the invention indicate that complete infiltration of the matrix material around arrays of monofilament fibers can readily be achieved, with substantially no void retention and little apparent damage to the fiber reinforcement material. Thus the method provides composites of highly uniform and controllable microstructure, exhibiting excellent homogeneity and strength at low cost and with good reproducibility.

DESCRIPTION OF DRAWINGS

The invention may be further understood by reference to the drawings wherein:

FIG. 1 illustrates a monofilament fiber array suitable for providing a ceramic matrix composite article in accordance with the invention;

FIG. 2 illustrates a flexible ceramic tape suitable for providing the matrix phase of a ceramic matrix composite article in accordance with the invention;

FIG. 3 shows a section of an assembly of matrix and reinforcing fiber sheets suitable for consolidation into a composite in accordance with the invention, and FIG. 4 is an electron photomicrograph of a section of a consolidated fiber-reinforced ceramic matrix composite material provided in accordance with the invention.

DETAILED DESCRIPTION

As previously noted, the invention employs relatively thin sheets of refractory inorganic fibers to provide the fiber reinforcement material for the ceramic matrix composites in order to insure adequate consolidation of the composite material. Typically, the aggregate fiber thickness of the sheet of fiber reinforcement material will not exceed approximately three times the thickness of the largest fibers therein, and in the preferred case the sheet will be a non-woven sheet or tape consisting of a monolayer of monofilament reinforcement fiber. By aggregate fiber thickness is meant the total thickness of the sheet to be used to provide the fiber reinforcement material, less any thickness contribution by binder and/or backing materials present as temporary support for the fibers.

Unidirectional monofilament fiber arrays are desirable constituents of ceramic matrix composite materials because, with such materials, the axis of strength reinforcement of the material can be controlled to best suit the intended use of the ceramic product. At present, such arrays are commercially available as monofilament fiber tapes comprising parallel arrays of reinforcing fibers bound into a cohesive tape by an applied organic binder. An example of such a tape is one consisting of silicon carbide monofilaments bound into a monolayer tape with an acrylic plastic binder.

Tapes of this type are not treatable using conventional ceramic matrix slurry dipping and winding processes or other conventional techniques for laying up preforms for fiber composites without first stripping the fiber from or otherwise disassembling, the tape. Nor does the application to such tapes of dry ceramic matrix materials, or the embedment of the tapes in the powdered dry matrix material, provide a satisfactory composite product.

The use of flexible ceramic sheet, on the other hand, offers an excellent way to combine the fiber reinforcement and the ceramic matrix material, providing good control over both the composition and the structure of the composite while at the same time insuring good fiber embedment and a low incidence of voids and fiber defects.

Based on the foregoing, the particularly preferred fiber sheet for composite fabrication is a monofilament fiber tape having an aggregate fiber thickness just equal to the diameter of the fibers present in the tape. This is tape wherein the fibers are provided as a monolayer of regularly spaced, parallel-aligned fibers embedded within or otherwise bonded to an adhesive or other polymer forming a binder or backing for the tape. The binder imparts the requisite physical integrity and handleability to the tape while at the same time stabilizing the relative positioning of the fibers as they are combined with the matrix material to form a preform for subsequent consolidation.

FIG. 1 of the drawing schematically illustrates such a tape in a form which is commercially available. As shown in magnified view in FIG. 1, tape 10 is formed of a parallel array of fibers 11, which fibers are bonded together and to a protective metal foil backing strip 12 with a plastic resin 13. The resin 13 serves to both bond the fibers onto the backing and to hold the fibers in a parallel array when the backing is removed from the fiber array prior to use.

Sheets or tapes of ceramic matrix material are most conveniently provided from slurries of powdered or other finely divided ceramic matrix material using a ceramic tape-casting process. First, a flowable slurry or suspension consisting essentially of an organic binder in combination with the selected ceramic matrix material, and optionally comprising a liquid vehicle, is prepared. This suspension is then tape-cast, generally by pouring or extruding the suspension through a long, narrow orifice onto a flat drying surface, and the liquid vehicle or binder is evaporated or cured to leave a thin, flexible film containing the ceramic matrix material.

Ceramic sheet prepared in this way is flexible yet relatively tough, and can be provided over a relatively wide range of thicknesses depending upon the configuration desired for the final reinforced composite product. FIG. 2 of the drawing schematically shows a section of flexible ceramic tape 20 prepared in this way, consisting predominantly of particulate glass or ceramic material 21 bound together into continuous sheet by an organic binder.

The method of the invention can be employed to make an essentially unlimited number of different fiber and matrix combinations into high quality fiber-reinforced ceramic matrix composite materials. Advantageously, the use of the method is not limited to any particular variety of fibers, nor is it limited in any way to matrix materials which can be fiberized or otherwise prepared in a special form for incorporation into the composite.

Examples of fiber materials which can be processed in accordance with the invention particularly include silicon carbide or boron monofilament fiber. Also useful for composite fabrication are fibers of carbon, alumina, glass, or other materials compatible with the selected ceramic matrix material and amenable to consolidation processing with heat and pressure into a dense, fiber-reinforced composite.

For the purpose of the present description the term ceramic is used in its broad sense to include amorphous ceramic materials such as glasses as well as crystalline ceramic materials such as glass-ceramics and conventional crystalline ceramic materials like alumina. Thus the ceramic matrix material employed in accordance with the invention can consist of a glass, a crystallizable glass or glass-ceramic which can be converted to a crystalline material during the further processing of the matrix, or a crystalline ceramic material such as alumina or zirconia which normally remains crystalline throughout the processing of the composite preform.

While powders of these matrix materials are preferably used to provide the ceramic sheet material for composite preform fabrication, matrix materials in the form of whiskers or other fine particulates could be used. Thus silicon carbide whiskers could be used in forming the ceramic sheet in a case where it is desired to include a silicon carbide phase in the matrix.

The invention may be further understood by reference to the following example describing the manufacture of a fiber-reinforced ceramic matrix composite in accordance therewith.

EXAMPLE

A monofilament fiber tape is selected for incorporation into a fiber-reinforced ceramic composite material. This tape consists of monofilament SiC fibers approximately 140 microns in diameter which are provided in a bonded array consisting of a monolayer of parallel-aligned fibers bound together with an acrylic binder. The array density is approximately 6 fibers per millimeter of tape width. The fiber tape is supplied with a removable aluminum foil backing; the backing is most conveniently removed after cutting the array to a desired shape and before combining it into a composite assembly.

A sheet of ceramic matrix material is provided for incorporation into the composite which consists of a tough flexible sheet containing a powdered glass-ceramic material in an acrylic resin binder. The ceramic sheet is prepared by tape-casting from a glass powder slurry which is prepared by mixing a quantity of glass powder with a suitable liquid vehicle system containing organic binders suitable for tape-casting.

The glass powder used to prepare the slurry is a thermally crystallizable calcium aluminosilicate glass having an average particle size of about 10 microns and having a composition, in parts by weight, of approximately 39.5 parts $SiO_2$, 38.5 parts $Al_2O_3$, 18.4 parts CaO, 0.485 parts $As_2O_3$ and 3.0 parts $ZrO_2$. Approximately 500 grams of this glass powder are suspended in approximately 310 grams of an isopropanol vehicle to form a thin slurry. Thereafter, a vehicle system consisting of approximately 924 grams of deionized water, 10 grams of a dispersing agent commercially available as Tamol-850, 18 grams of an alkali-swellable acrylic polymer thickening agent commercially available as Acrysol TT615, and 240 grams of an acrylic polymer binder commercially available as Rhoplex HA-8 is provided. The dispersing agent, thickening agent and binder are all commercially available from the Rohm and Haas Co., Philadelphia, Pa.

The vehicle thus provided is next combined with the glass powder suspension, with continuous stirring to provide a homogeneous mixture. To this mixture is then added approximately 8 ml. of concentrated aqueous $NH_4OH$, with blending being continued for 15 minutes.

The slurry resulting from this blending is next poured into a casting reservoir having a bottom orifice approximately six inches wide and approximately 0.035 inches in height. The casting reservoir is positioned over a drying table covered with a plastic film forming a release layer, and the slurry is cast through the orifice at an orifice traverse rate of one inch/second across the casting surface to provide a tape layer which, after drying for 15 hours, provides a tough flexible ceramic tape approximately 0.008 inches in thickness. This tape is readily removed from the release film and may conveniently be cut to provide smaller sections of ceramic matrix sheet if desired.

A preform for a ceramic matrix composite is laid up employing the described fiber tape and four-inch square sections cut from the tape-cast ceramic matrix sheets produced as above described. Alternating layers of the matrix sheets and fiber ribbons are stacked to form a composite preform comprising eight fiber layers interleaved in alternating fashion with nine layers of ceramic matrix sheet.

A section of such a preform, indicated as preform section 30, is schematically shown in FIG. 3 of the drawing. As illustrated in FIG. 3, the orientation of each array of fibers 11 and 11a between ceramic matrix sheets 20 in section 30 is alternated 90°. This provides bi-directional strengthening and stiffening of the final composite.

The laid up preform provided as described is next subjected to a binder burnout treatment wherein it is heated in air to 650° C. for two hours to remove organic constituents therefrom. Thereafter, the preform is positioned in a hot press and consolidated, first at 850° C. under a pressure of approximately 30 psi for five minutes, and thereafter at 1440° C. and 1470 psi for 10 minutes. This consolidation treatment effects not only complete consolidation of the preform to a dense composite material, but also causes conversion of the powdered glass matrix material to a fully crystallized glass-ceramic material wherein anorthite ($CaO.Al_2O_3.2SiO_2$) constitutes the principal crystal phase. The resulting consolidated fiber-reinforced ceramic matrix composite is then removed from the hot press and tested for physical and structural properties.

FIG. 4 of the drawing is an electron photomicrograph taken at a magnification of 50× of a polished partial cross-section of a consolidated ceramic composite provided in accordance with the procedure of the Example. The cross-sectioned SiC fibers 11 in FIG. 4 appear as parallel arrays of circles, the dark centers in each fiber consisting of carbon. Fibers 11a running transverse to the cross-sectioned fibers (or parallel to the plane of the micrograph) appear as grey-to-black regions, except at the locations of voids 31 where fibers have been pulled out of the consolidated matrix material 21 during preparation of the micrograph sample.

As is evident from an examination of this photomicrograph, substantially complete infiltration of the matrix material from the original ceramic sheet layers into the fiber interstices, with complete envelopment of the fiber reinforcement phase, is achieved during consolidation. No voids in the matrix or apparent defects or displacements of the fiber reinforcement are evident.

As previously noted, the invention is not limited in its application to the use of any particular glass, glass-ceramic or ceramic matrix material; rather a wide variety of different matrix materials, or combinations of matrix materials, may be employed to provide the continuous glass or ceramic phase of the composites. Table I below reports additional examples of illustrative glasses and glass-ceramics which may be used to produce flexible ceramic sheet generally following the procedure of the Example, and which can be consolidated into ceramic matrix materials having utility for fiber-reinforced composite fabrication.

Included in Table I for each of several different glass and glass-ceramic matrix materials are the oxide compositions of each of the materials, in parts by weight as calculated from the batch, a general indication of the character of each material, whether glass or glass-ceramic, and in the case of the glass-ceramic materials, an indication of the crystalline phases which may be developed by appropriate heat treatment in the ceramic matrix phase of a composite incorporating the composition.

TABLE I

|  | 1 | 2 | 3 | 4 | 5 | 6 |
|---|---|---|---|---|---|---|
| $SiO_2$ | 81 | 66.3 | 50.63 | 43.66 | 48.1 | 57.0 |
| $Al_2O_3$ | 2 | 19.3 | 27.66 | 37.11 | 35.6 | 16.0 |
| $B_2O_3$ | 13 | — | — | — | — | 4.0 |
| $Li_2O$ | — | 2.7 | — | — | — | — |
| $Na_2O$ | 4 | — | — | — | — | — |
| $K_2O$ | — | — | — | — | — | — |
| $MgO$ | — | 2.7 | 3.44 | 13.03 | 8.3 | 7.0 |
| $CaO$ | — | — | — | — | 8.1 | 10.0 |
| $BaO$ | — | 1.0 | 13.27 | 6.20 | — | 6.0 |
| $ZrO_2$ | — | 2.0 | — | — | — | — |
| Other | — | 5 $Nb_2O_5$ 1 $As_2O_3$ | 1.0 $As_2O_3$ | 0.7 $As_2O_3$ | 0.5 $As_2O_3$ | — |
| Matrix Type | Glass | Glass-Ceramic | Glass-Ceramic | Glass-Ceramic | Glass-Ceramic | Glass |
| Crystal Phase |  | β-spodumene Solid Soln. | Barium Osumilite | Barium-Stuffed Cordierite | Anorthite/Cordierite |  |

While the preferred flexible ceramic sheet for use in the present invention comprises an organic binder containing the powdered ceramic matrix material, the invention is not limited to any particular type of organic binder, nor does it exclude the use of inorganic plastic materials such as clays or the like to provide inorganic binding phases for the selected matrix powder.

In the case of organic binders, acrylic binder systems such as described in the foregoing example constitute the presently preferred binders, but other conventional binder systems including polyvinyl acetate systems or polyvinyl butyral systems could alternatively be used. Binder systems of this type are, for casting purposes, usually used with a compatible solvent such as water, methanol, ethanol, propanol, isopropanol or other evaporable organic or inorganic liquid, the liquid aiding in the mixing and flow of the binder and ceramic matrix powder and generally being removed in the course of drying or heat-curing the cast ceramic sheet. Plasticizers are generally also present to enhance the flexibility of the ceramic sheet after solvent removal.

Alternative organic binder systems could comprise curable resin systems which could be provided in liquid form but cured after sheet casting to provide a flexible polymerized binder system by heat, light, or chemical reaction. Again, the cured resin would preferably be sufficiently plastic to provide flexible ceramic sheet.

The thickness of the flexible ceramic sheet employed in accordance with the invention is not critical, and can be varied considerably depending upon the tape-casting or other process used to form the ceramic slurry or suspension into sheet. Using the tape-casting procedure of the Example, die orifice widths in the range of about 0.025–0.050 inches used in combination with slurry viscosities in the range of about 65–80 cps. can readily produce dry sheet thicknesses in the range of about 0.005–0.016 inches. Of course thicker and/or thinner ceramic sheet may readily be provided by varying the viscosity of the tape-casting slurry and/or by changing the dimensions of the casting die orifice.

As previously noted, the preferred fiber form for use in the invention is a fiber tape or sheet comprising a parallel array of monofilament fibers forming a fiber monolayer. Generally this type of fiber array is preferred because it favors matrix infiltration and void-free fiber encapsulation in the matrix at moderate consolidation pressures and temperatures. Nevertheless, fiber arrays comprising two or even more layers of fibers could alternatively be used, provided that the viscosity of the powdered matrix material at the selected consolidation temperature is sufficiently low that dense, void-free consolidation of the fiber-ceramic sheet preform can be achieved at practically attainable consolidation pressures. An example of a fiber sheet having an aggregate fiber thickness of twice the fiber diameter would be a woven fiber sheet in plain weave and comprising a monofilament warp and weft.

Depending upon the diameters of the monofilament reinforcement used to provide the composite ceramic and upon the thickness and flexibility of the ceramic sheet employed, a rather wide variety of preform shapes can be prepared by sheet stacking, layering, or winding and subsequent consolidation under appropriate conditions of heat and pressure. Thus employing fiber reinforcing monofilament of small diameter, and ceramic matrix sheet of high flexibility and low thickness, curved or even tubular preforms can be provided by stacking or winding alternating layers of the fiber reinforcement and ceramic matrix sheet on a suitable supporting substrate. Thereafter consolidation by hot-pressing, hot isostatic pressing, or other pressing technique which will force the ceramic matrix into conformity with the substrate and provide matrix infiltration of the arrays of reinforcing fibers maybe used to consolidate the layered assembly into a dense composite ceramic material.

Binder burnout and consolidation treatments employed in the fabrication of ceramic matrix composites as herein described do not differ significantly from those used for similar consolidation processing in the prior art. Binder levels in the matrix material are substantially equivalent to those found in other preforms made using slurries of ceramic matrix powders, and the burnout of the polymers or binders present in the monofilament fiber arrays does not appear to present any difficulties in the consolidation of preforms having configurations such as herein described.

Of course the compositions and procedures specifically described herein are merely illustrative of materials and processes which may be employed in the practice of the present invention within the scope of the appended claims.

I claim:

1. A method for the manufacture of a fiber-reinforced ceramic matrix composite article comprising the steps of:
   (a) combining a particulate ceramic material and a binder material into a mixture and forming the mixture into a ceramic sheet;
   (b) providing a fiber reinforcement material consisting essentially of a sheet of refractory inorganic fibers wherein the fibers are disposed in open array;
   (c) combining the ceramic sheet and the fiber sheet to provide a multilayer preform comprising at least one layer consisting of the fiber sheet and at least one layer consisting of ceramic sheet; and
   (d) applying heat and pressure to the preform to consolidate it into a unitary, substantially void-free, fiber-reinforced ceramic matrix composite article.

2. A method in accordance with claim 1 wherein the continuous ceramic sheet includes a binder material which is plastic, and wherein the continuous ceramic sheet is flexible.

3. A method in accordance with claim 2 wherein the plastic binder material is an organic resin.

4. A method in accordance with claim 3 wherein the organic resin is an acrylic resin.

5. A method in accordance with claim 2 wherein the plastic binder material is an organic resin and wherein the step of combining the particulate ceramic matrix material with the binder material comprises the steps of mixing the binder with an evaporable solvent for the binder and thereafter combining the mixed binder and solvent with the particulate ceramic material to provide a mixture which is a fluid suspension of the particulate ceramic material in the mixed binder and solvent.

6. A method in accordance with claim 5 wherein the step of forming the mixture into a continuous ceramic sheet comprises the step of casting the fluid suspension onto an extended substrate and converting the cast suspension into a flexible ceramic tape.

7. A method in accordance with claim 1 wherein the fiber reinforcement material consists essentially of a flexible sheet of refractory inorganic fibers having an aggregate fiber thickness not exceeding two fiber diameters.

8. A method in accordance with claim 7 wherein the fiber reinforcement material consists essentially of a woven sheet of fibers comprising a monofilament warp and a monofilament weft in plain weave.

9. A method in accordance with claim 1 wherein the fiber reinforcement material consists essentially of a flexible sheet comprising a monolayer of refractory inorganic fibers.

10. A method in accordance with claim 9 wherein the monolayer of refractory inorganic fibers consists essentially of a parallel array of inorganic monofilament fiber.

11. A method in accordance with claim 7 wherein the refractory inorganic fibers are composed of a material selected from the group consisting of silicon carbide, boron, carbon, glass, glass-ceramic, silicon nitride, and alumina.

12. A method in accordance with claim 10 wherein the inorganic monofilament fiber consists of boron or silicon carbide fiber.

13. A method in accordance with claim 10 wherein the flexible sheet further comprises an organic binder material within which or upon which the monolayer of refractory inorganic fibers is disposed, and wherein the monolayer consists of a parallel array of silicon carbide monofilament fiber.

14. A method in accordance with claim 1 wherein the ceramic sheet and the fiber sheet are combined by stacking multiple sections of the ceramic sheet and multiple sections of the fiber sheet in alternating layers to form the multilayer preform.

15. A method in accordance with claim 14 wherein sections of ceramic sheet form the opposing outer layers of the preform.

16. A method in accordance with claim 14 wherein each of the sections of fiber sheet consists essentially of a flexible sheet comprising a monolayer of refractory inorganic monofilament fibers bonded into the configuration of a parallel fiber array.

17. A method in accordance with claim 16 wherein the multilayer preform includes at least two fiber sheets comprising parallel arrays of inorganic fibers and wherein the directions of the fibers in each of the sheets are transverse to one another.

18. A method in accordance with claim 1 wherein the step of applying heat and pressure to the preform to consolidate it into a unitary, substantially void-free, fiber-reinforced ceramic matrix composite article comprises the steps of first heating the preform to a temperature sufficient to remove solvents and organic binders therein, and then heating the preform under pressure to a temperature sufficient to sinter and consolidate the particulate ceramic material into a continuous, substantially void-free matrix.

19. A method in accordance with claim 18 wherein the particulate ceramic matrix material is a thermally crystallizable glass, and wherein, after heating to sinter and consolidate the thermally crystallizable glass to a substantially void-free matrix, heating is continued for a time sufficient to convert the void-free matrix into a crystalline matrix.

* * * * *